United States Patent
Fukumoto

[11] Patent Number: 5,852,591
[45] Date of Patent: Dec. 22, 1998

[54] MAGNETO-OPTICAL RECORDING MEDIUM AND HEAD UNIT FOR A MAGNETO-OPTICAL RECORDING MEDIUM

[75] Inventor: Atsushi Fukumoto, Kanagawa, Japan

[73] Assignee: Sony Corporation, Tokyo, Japan

[21] Appl. No.: 564,371

[22] PCT Filed: Apr. 17, 1995

[86] PCT No.: PCT/JP95/00743

§ 371 Date: Dec. 2, 1996

§ 102(e) Date: Dec. 2, 1996

[87] PCT Pub. No.: WO95/29483

PCT Pub. Date: Nov. 2, 1995

[30] Foreign Application Priority Data

Apr. 23, 1994 [JP] Japan ................................. 6-107651

[51] Int. Cl.⁶ .................................................. G11B 11/00
[52] U.S. Cl. ........................................... 369/13; 369/275.4
[58] Field of Search .......................... 369/13, 112, 275.4, 369/277, 278, 279, 275.2; 365/122

[56] References Cited

U.S. PATENT DOCUMENTS 5,602,823  2/1997  Aoki et al. ............................ 369/275.4
5,636,201  6/1997  Ooki .................................... 369/275.4

FOREIGN PATENT DOCUMENTS 59198549  11/1984  Japan .
3276445  12/1991  Japan .

Primary Examiner—Tan Dinh
Attorney, Agent, or Firm—Limbach & Limbach LLP

[57] ABSTRACT

A magneto-optical recording medium having a substrate and magneto-optical recording film. The substrate is formed from a material having light transmittivity. One surface of the substrate is provided with a magneto-optical recording film. When light having a wavelength of $\lambda$ is irradiated on the surface of the substrate having the magneto-optical recording film, grooves are formed in film which have an optical depth with a lower limit of $\lambda/8$ and an upper limit of $\lambda/4$ or less. The magneto-optical recording film is formed so that the Kerr ellipticity thereof becomes 0°. A head unit for the magneto-optical recording medium has an optical-axis device for compensating the Kerr ellipticity of the magneto-optical recording medium. The optical axis device is in an optical path between an object lens for focusing a light beam emitted from a light source on the magneto-optical recording film and a polarization beam splitter.

3 Claims, 6 Drawing Sheets

MAGNETO-OPTICAL RECORDING MEDIUM AND HEAD UNIT FOR A MAGNETO-OPTICAL RECORDING MEDIUM

TECHNICAL FIELD

The present invention relates to a magneto-optical recording medium and a head unit for a magneto-optical recording medium. Particularly, the present invention relates to a magneto-optical recording medium using a substrate where grooves are formed and also a head unit for a magneto-optical recording medium which compensates the Kerr ellipticity of the magneto-optical recording medium.

BACKGROUND ART

In the magneto-optical disks as a magneto-optical recording medium, grooves for guiding a light beam irradiated to the magneto-optical disk have hitherto been formed concentrically or spirally. At the time of the recording or reproduction of the magneto-optical disk, the tracking control of the light beam irradiated to the magneto-optical disk is performed based on the reflected light from the grooves of the light beam which was irradiated on the magneto-optical disk. As a consequence, in the magneto-optical disk, data is recorded on an area (hereinafter referred to as a land) between grooves at the time of the recording, and data recorded on the land is read out at the time of the reproduction.

Incidentally, in an magneto-optical disk such as this, with the object of enhancing the recording density there has been proposed a magneto-optical disk where signals are recorded on both a groove and a land and thereby a wide recording area is assured. When a magneto-optical disk such as this is reproduced, however, cross talk from nearby grooves or lands becomes a problem.

As a method of reducing this cross talk, there has been proposed an optical method and a signal processing method. In the optical method, three light spots are irradiated on the magneto-optical disk, and when the signal on the groove (or land) is reproduced with the central light spot, the signal on the land (or groove) is reproduced with the light spots before and after, thereby eliminating the cross talk caused by the signal component of the land (or groove) included in the reproduced signal. On the other hand, in the signal processing method, the cross talk included in the reproduced signal can be eliminated by improving the signal-to-noise ratio (SN ratio) of the reproduced signal with Viterbi decoding.

However, in the aforementioned optical method, since three spots are irradiated on the magneto-optical disk and the signals on adjacent lands or grooves are reproduced, there is the problem that the pick-up structure becomes complicated and is increased in size. Also, the signal processing method has disadvantages in that the circuit structure becomes complicated. Thus, either case has still been unsatisfactory from practical use as a solution of eliminating the cross talk.

DISCLOSURE OF INVENTION

The present invention relates to a magneto-optical recording medium and a head unit for a magneto-optical recording medium which solve the aforementioned problems.

In the present invention, a magneto-optical recording medium has a substrate formed from material having light transmittivity and also has a magneto-optical recording film provided on one surface of the substrate. In said one surface of the substrate where the magneto-optical recording film is provided, when a wavelength of a light beam, irradiated to the magneto-optical recording medium, is $\lambda$, there are formed grooves having an optical depth where its lower limit is $\lambda/8$ and its upper limit is $\lambda/4$ or less.

Furthermore, in the present invention, a head unit for a magneto-optical recording medium having a magneto-optical recording film having a Kerr ellipticity of a predetermined value, comprises: a light source; an object lens for focusing a light beam, emitted from the light source, on the magneto-optical recording film of the recording medium; first optical split means for separating a return light reflected from the magneto-optical recording film on which the light beam is incident through the object lens, from the light beam emitted from the light source; second optical split means for splitting the return light reflected from the magneto-optical recording film on which the light beam is incident through the object lens, separated by the first optical split means, into a P-polarized light component and an S-polarized light component; and compensation means disposed in an optical path of the return light between the object lens and the second optical split means, for compensating the Kerr ellipticity of the magneto-optical recording film of the recording medium.

In the magneto-optical disk according to the present invention, the groove is formed so that the optical depth becomes $\lambda/4$ to $\lambda/8$, and the magneto-optical recording film is formed so that the Kerr ellipticity thereof becomes approx. 0°. As a consequence, the cross talk can be reduced when the data, which were recorded on both the land and the groove of the magneto-optical disk, are reproduced.

BRIEF DESCRIPTION OF DRAWINGS

FIG. 1(A) is a diagram showing the structure of the land and the groove of the magneto-optical disk according to the embodiment of the present invention. FIG. 1(B) is a sectional view showing the section of a part of the magneto-optical disk according to the present invention. And FIG. 1(C) is a diagram showing the structure of the recording film of the magneto-optical disk of the present invention;

FIG. 5(A) is a characteristic diagram showing the values of the cross talk which were obtained by calculation and the values of the cross talk which were measured without using the $\lambda/12$ board. And FIG. 5(B) is a characteristic diagram showing the values of the cross talk which were obtained by calculation and the values of the cross talk which were measured using the $\lambda/12$ board.

BEST MODE FOR CARRYING OUT THE INVENTION

Hereinafter, a description will be made in detail of a magneto-optical recording medium and a head unit for a magneto-optical recording medium according to the present invention, accompanying with the drawings. In an embodiment described hereinafter, a magneto-optical disk is taken and described as an example of the magneto-optical recording medium.

Figure 1A:
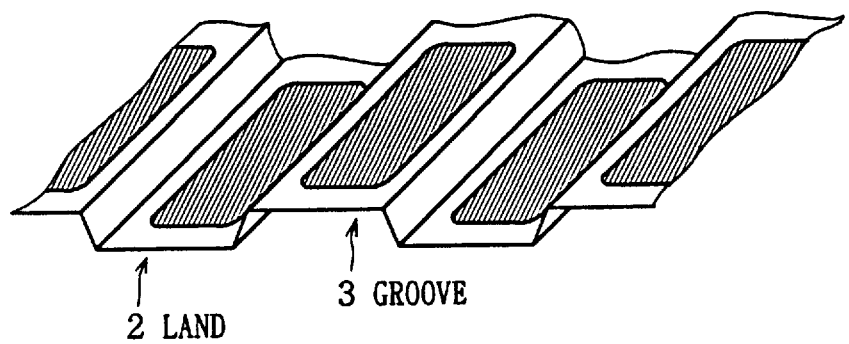
FIGS. 1(A) to 1(C) are schematic diagrams showing the structure of a magneto-optical disk according to an embodiment of the present invention.
Figure 1B:
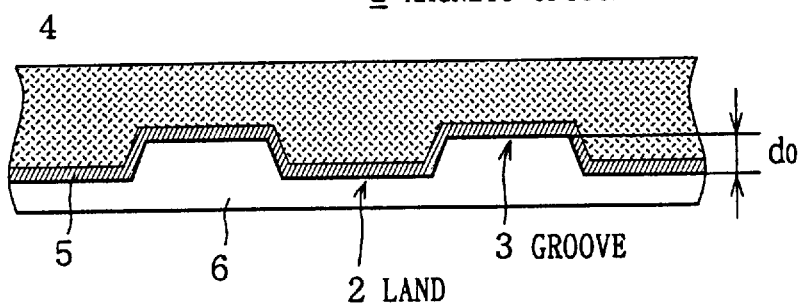
Figure 1C:
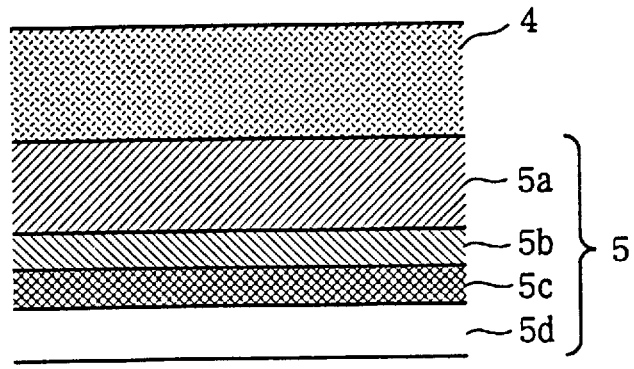

FIGS. 1(A) to 1(C) show the structure of the magneto-optical disk according to the embodiment of the present invention. The magneto-optical disk 1 has a disk substrate 4 having light transmittivity, a magneto-optical recording film 5, and a protective film 6, as shown in FIG. 1(B). The disk substrate 4 is formed into a disk shape of thickness 1.2 nm with a synthetic resin material such as polycarbonate or PMMA, and on one surface of the substrate 4, grooves 3 are concentrically or spirally formed. As shown in FIG. 1(A), an area between the grooves 3 becomes a land 2. In the magneto-optical disk 1, the tracking control of the light beam, irradiated on the magneto-optical disk 1, is performed based on the light reflected from the groove, and data is recorded on both the land 2 and the groove 3. For the data that was recorded on the magneto-optical disk 1, as with the aforementioned recording, the tracking control of the light beam, irradiated on the magneto-optical disk 1, is performed based on the light reflected from the groove, and the data which was recorded on the land 2 or the groove 3 is read out. At this time, the qualities of the signals read from the land 2 and the groove 3 can be made equal to each other by forming the widths of the land 2 and the groove 3 so as to become 1:1. The optical depth $d_0$ of the groove 3 is given by the following equation:

$$d_0 = \frac{nd}{\lambda} \quad (1)$$

where $\lambda$ is the wavelength of the light beam irradiated to the magneto-optical disk 1, "n" is the index of refraction of the disk substrate 4, "d" is the physical depth of the groove 3. The equation giving the aforementioned $d_0$ is normalized with the wavelength $\lambda$ of the light beam irradiated to the magneto-optical disk 1.

The magneto-optical recording film 5 is formed on the surface where the land 2 and the groove 3 of the disk substrate 4 are formed by deposition and sputtering. The magneto-optical recording film 5, as shown in FIG. 1(C), is composed of a plurality of films and formed on the disk substrate 4 so that a first film, a second film, a third film, and a fourth film are layered in this order from the side on which the light beam is incident. The first film 5a is composed of SiN and formed, on said one surface where the land 2 and the groove 3 of the disk substrate 4 are formed, so that the film thickness becomes 800 Å. The second film 5b is formed on the first film 5a with a vertical recording material such as TbFeCo so that the film thickness becomes 200 Å. The third film 5c is formed on the second film 5b with SiN so that the film thickness becomes 230 Å. The fourth film 5d is formed on the third film 5c with material having a high reflectance such as Al so that the film thickness becomes 600 Å. If the magneto-optical disk 5 is thus formed, the Kerr ellipticity $\epsilon_k$ can be made 0°, for example, when the wavelength $\lambda$ of the light beam which is irradiated to the magneto-optical disk 1 is made 780 nm.

The protective film 6 is formed on the fourth film 5d of the magneto-optical recording film 5 with synthetic resin material such as ultraviolet hardening resin so that the protective film 6 covers the magneto-optical recording film 5 to protect the film 5.

The light beam in the state focused by a head unit such as described later is irradiated on the magneto-optical recording film 5 through the disk substrate 4. Also, in recording data on the magneto-optical disk 1, a vertical magnetic field is applied from the protective film 6 side by an external magnetic-field generation unit (not shown), and at the same time the light beam with a recording level is irradiated on the magneto-optical recording film 5 through the disk substrate 4, as described above. With the light beam irradiated on the magneto-optical recording film 5 and the vertical magnetic field applied from the protective film 6 side, data is recorded on the magneto-optical disk 1. The data which was recorded on the magneto-optical disk 1 is read out with Kerr effect. Specifically, the light beam with a level lower than the recording level is irradiated via the disk substrate 4, and the irradiated light beam is reflected by the magneto-optical recording film 4. As this occurs, the plane of linear polarization of the light beam is rotated depending upon the direction of magnetization of the magneto-optical recording film 4. By making use of the rotational phenomenon of the linear polarization plane of the light beam irradiated on the magneto-optical disk 1, the data which was recorded on the magneto-optical recording film 5 of the magneto-optical disk 1 is read out.

As described above, in the magneto-optical disk 1 according to the present invention, the Kerr ellipticity of the magneto-optical recording film 5 is formed so as to become 0°, and as described later, the optical depth of the groove 3 is formed so as to become $\lambda/4$ to $\lambda/8$. Particularly, in this embodiment, the optical depth of the groove 3 is formed so as to become approx. $\lambda/6$. As a consequence, the cross talk can be reduced when the data which were recorded on both the land 2 and the groove 3 of the magneto-optical disk 1 are reproduced.

Now, with FIG. 2 a description will be made of the constitution of a head unit 10 for the magneto-optical disk according to the embodiment.

Figure 2:
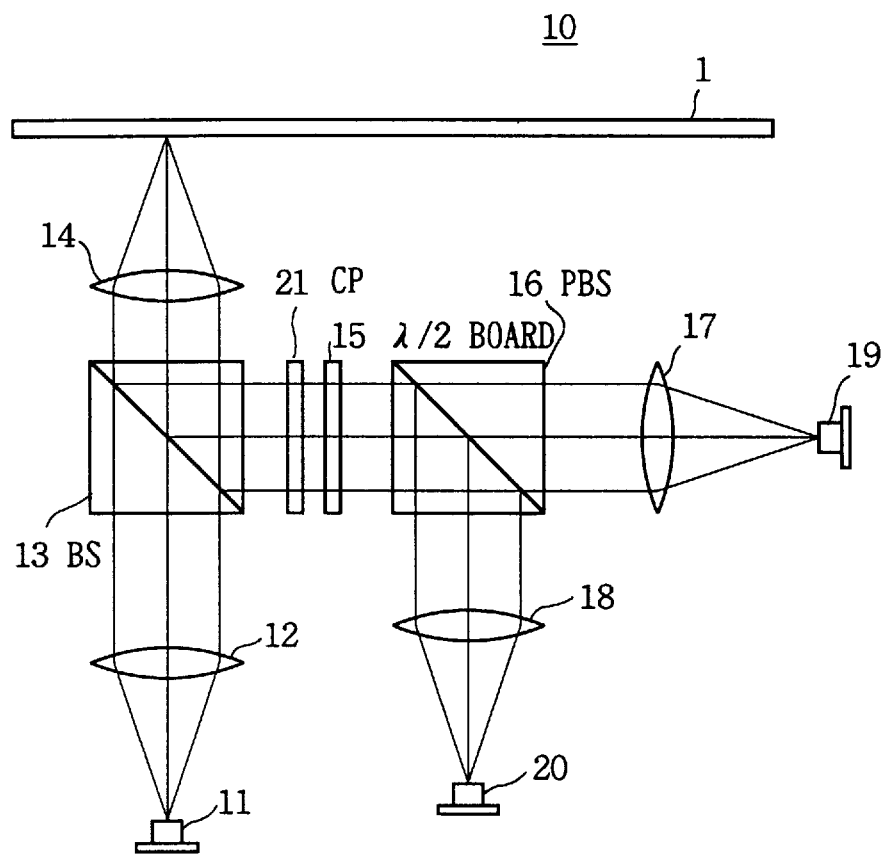
FIG. 2 is a diagram showing the structure of a head unit according to an embodiment of the present invention.

In FIG. 2, the head unit 10 has a light source 11, a collimator lens 12, a beam splitter 13, an object lens 14, a $\lambda/2$ wavelength board 15, a polarization beam splitter 16, focus lenses 17 and 18, photodetectors 19 and 20, and a phase compensating board 21. The light source 11 is constituted by a semiconductor laser device, etc. The collimator lens 12 converts a light beam emitted and emanated from the light source to a collimated light beam. The beam splitter 13 is formed into a cubic shape by bonding a pair of trigonal optical prisms together and separates the light beam emitted from the light source 11 from the light beam reflected by the magneto-optical recording film 5 of the magneto-optical disk 1. In this embodiment, the light beam reflected by the magneto-optical disk 1 is reflected 90° at the bonded surface of a pair of optical prisms of the beam splitter 13 and therefore is separated from the light beam emitted from the light source 11. The object lens 14 focuses the light beam, emitted from the light source 11 through the beam splitter 13, on the magneto-optical recording film 5 of the magneto-optical disk 1 through the disk substrate 4. The object lens 14 is driven by means of an actuator (not shown) in the optical axis direction, i.e., focusing direction, and in the plane direction orthogonally crossing to the optical axis, i.e., tracking direction. The object lens 14 is composed, for example, of a single unspherical lens. The $\lambda/2$ wavelength board 15 rotates the plane of polarization of the reflection light from the magneto-optical disk 1, which was split by the beam splitter 13, by 90°. The polarization beam splitter 16 splits the reflection light from the magneto-optical disk 1, which was split by the beam splitter 13 and passed through the $\lambda/2$ wavelength board 15, into two light beams, a P-polarized light component and an S-polarized light component. The light beam of the P-polarized light component of the two light beams, the P-polarized light component and the S-polarized light component split by the polarization beam splitter 16, is focused to the photodetector 19 through the focus lens 17. Also, the light beam of the S-polarized light component is focused to the photodetector 20 through the focus lens 18. By taking a difference between the output signal from the photodetector 19 and the output signal from the photodetector 20, the reproduction signal of the data that was recorded on the magneto-optical disk 1 is generated. In addition, with the output signals from the photodetectors 19 and 20, there is generated an error signal, such as a focusing error signal and a tracking error signal for driving the actuator in the focusing and tracking directions which drives the aforementioned object lens 14.

As the phase compensating board 21, a wavelength board is employed. This phase compensating board 21 has a retardation so that a phase ($\tan^{-1}(\epsilon_k/\theta_k)$) occurring due to the Kerr ellipticity $\epsilon_k$ is canceled. That is, if the phase compensation difference of the phase compensating board 21 is expressed by $\delta$, the phase difference $\delta$ will be expressed by the following equation:

$$\delta = \tan^{-1} \frac{\epsilon_k}{\theta_k} \quad (2)$$

where $\epsilon_k$ is the Kerr ellipticity and $\theta_k$ is the Kerr rotational angle.

In the phase compensation method using this wavelength board, phase compensation is performed as follows. In a case where there is employed a wavelength board having the same retardation as the phase ($\tan^{-1}(\epsilon_k/\theta_k)$) occurring due to the Kerr ellipticity $\epsilon_k$ of the magneto-optical recording film 5 of the magneto-optical disk 1, the phase compensation of the reflection light from the magneto-optical disk 1 is performed by arranging the wavelength board comprising the phase compensating board 21 so that the crystal optical axis of the board becomes parallel to the plane of polarization of an incident light beam (in this embodiment, a light beam reflected from the magneto-optical disk 1, which was split by the beam splitter 13). Also, in a case where there is employed a wavelength board having a retardation greater than the phase ($\tan^{-1}(\epsilon_k/\theta_k)$) caused by the Kerr ellipticity $\epsilon_k$ of the magneto-optical recording film 5 of the magneto-optical disk 1, the phase compensation of the reflection light from the magneto-optical disk 1 is performed by rotating the optical axis of the wavelength board. With the phase compensating board 21 such as this, the Kerr ellipticity $\epsilon_k$, caused by the Kerr effect of the light beam irradiated to the magneto-optical disk 1, can be compensated and at the same time the cross talk, which occurs in reading data that was recorded on the magneto-optical disk 1, can be reduced. As a consequence, there is obtainable a cross talk characteristic which is equivalent to that obtained when the Kerr ellipticity $\epsilon_k$ is 0°.

Now, the case of the head unit 10 of the present invention using the phase compensating board 21 will be compared and described with the case using no phase compensating board 21.

Figure 3:
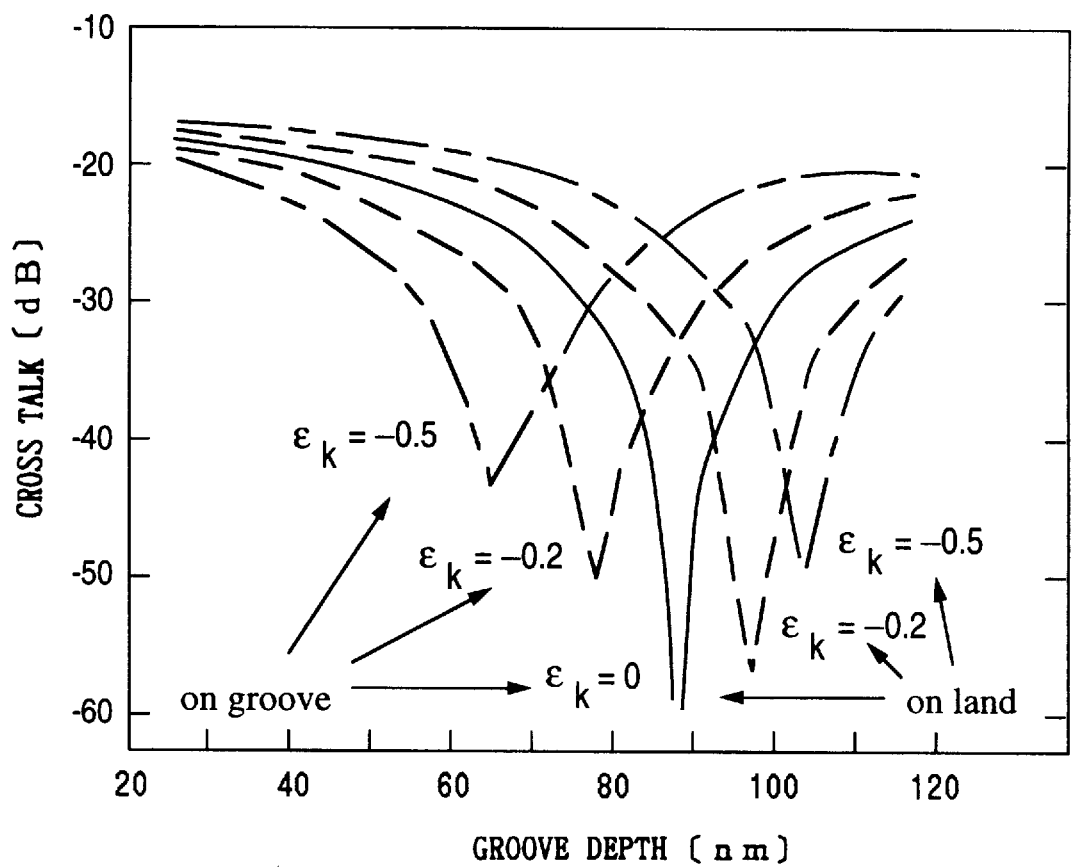
FIG. 3 is a characteristic diagram showing cross talk characteristics which were measured with various Kerr ellipticities.

Initially, in the case using no phase compensating board 21, the results which were calculated by varying the Kerr ellipticity $\epsilon_k$ to 0°, −0.2°, and −0.5° are shown in FIG. 3. At this time, assume the Kerr rotational angle $\theta_k$ has been fixed to 0.9°. The leakage on the groove 3 of a signal from the land 2 is referred to as "cross talk on groove" and is shown by "on groove" in FIG. 3. The leakage on the land 2 of a signal from the groove 3 is referred to as "cross talk on land" and is shown by "on land" in FIG. 3. In FIG. 3, there is shown the case of the Kerr ellipticity $\epsilon_k$ having a minus sign. On the contrary, in the case of the Kerr ellipticity $\epsilon_k$ having a plus sign, "the cross talk on groove" in the case of the Kerr ellipticity $\epsilon_k$ having a minus sign becomes "the cross talk on land" in the case of the Kerr ellipticity $\epsilon_k$ having a plus sign, and "the cross talk on land" in the case of the Kerr ellipticity $\epsilon_k$ having a minus sign becomes "the cross talk on groove" in the case of the Kerr ellipticity $\epsilon_k$ having a plus sign. For the other calculation conditions, the mark length of the signal which was recorded on the magneto-optical disk 1 is 1 $\mu$m, the widths of the land 2 and the groove 3 each are 0.8 $\mu$m, the wavelength $\lambda$ of the light beam, irradiated on the magneto-optical disk 1, is 0.78 $\mu$m, and the numerical aperture (NA) of the object lens is 0.53.

If in FIG. 3 the Kerr ellipticity $\epsilon_k$ is 0°, then "the cross talk on land" and "the cross talk on groove" will become nearly equal to each other and the cross talk will become minimum when the physical depth of the groove is 90 nm, i.e., the optical depth of the groove is about $\lambda/6$. If the Kerr ellipticity $\epsilon_k$ is not 0°, then the groove depths, where "the cross talk on land" and "the cross talk on groove" become minimum, will differ. If the absolute value of the Kerr ellipticity $\epsilon_k$ becomes greater, then the depths where the cross talks become minimum will tend to greatly differ. As shown in FIG. 3, in order to make "the cross talk on land" and "the cross talk on groove" minimum at the same time, the Kerr ellipticity $\epsilon_k$ of the magneto-optical recording film 5 of the magneto-optical disk 1 needs to be 0° and at the same time the optical depth of the groove 3 needs to be about $\lambda/6$. As a consequence, because the cross talk can be render minimum, it becomes possible to record data on both the groove and the land and the recording density can be thus enhanced.

Figure 4A:
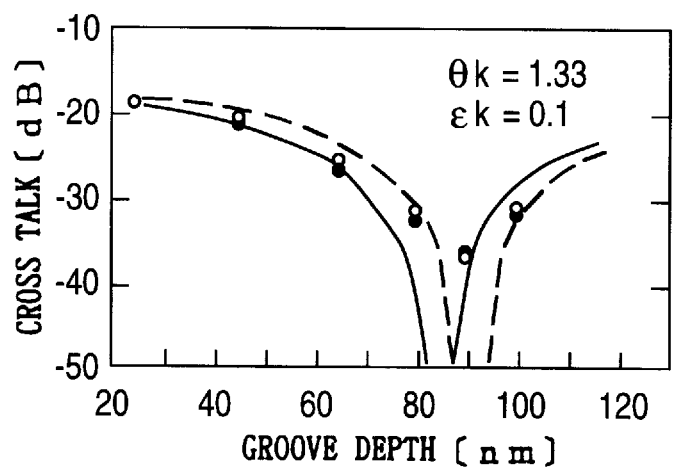
FIGS. 4(A) to 4(C) are characteristic diagrams showing the values of the cross talk which were obtained by calculation and the values of the cross talk which were measured by experiment.
Figure 4B:
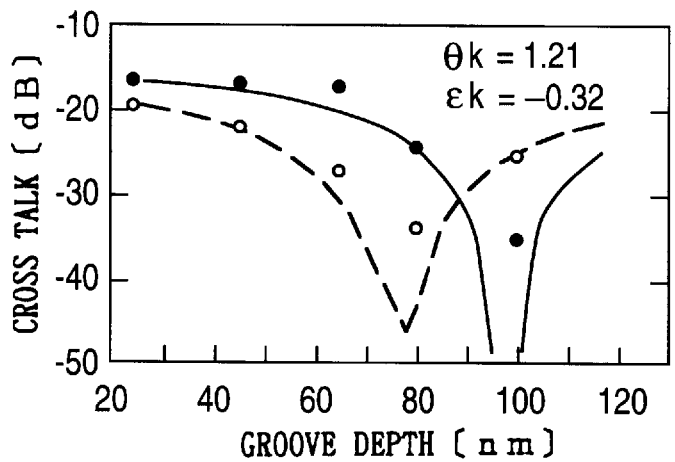
Figure 4C:
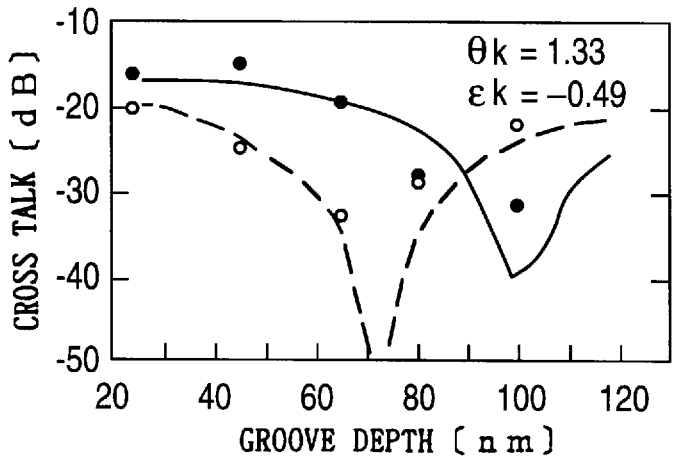

Subsequently, the case of the head unit 10 having the phase compensating board 21 will be described with an experimental example. In FIGS. 4(A) to 4(C), there are shown the results of measurement of the cross talk, which were obtained when a signal with a predetermined mark length was recorded at the Kerr rotational angle $\theta_k$ and Kerr ellipticity $\epsilon_k$ of 1.23° and 0.1°, 1.21° and −0.32°, and 1.33° and 0.49° with a magneto-optical disk having various kinds of groove depths. In FIGS. 4(A) to 4(C), "●" represents the measured value of "the cross talk on land" and "o" represents the measured value of "the cross talk on groove." The solid line and broken line in FIGS. 4(A) to 4(C) show the results which were obtained based on the conditions that were used in FIG. 3 by calculation. As a consequence, as evident in FIGS. 4(A) to 4(C), the result of calculation and the measurement by experiment are nearly equal to each other. As shown in FIG. 4(A), when the Kerr ellipticity $\epsilon_k$ is 0.1° and the physical depth of the groove is 90 nm, "the cross talk on land" and "the cross talk on groove" can be reduced to less than −35 dB at the same time. This cross talk value is a value enough to reproduce the digital signal or digital data which was recorded on the magneto-optical disk serving as a recording medium. As with the result of calculation of FIG. 3, as shown in FIGS. 4(B) and 4(C), even for the results obtained by experiment, as the Kerr ellipticity $\epsilon_k$ becomes greater, the groove depths, where "the cross talk on land" and "the cross talk on groove" become minimum, differ.

Figure 5A:
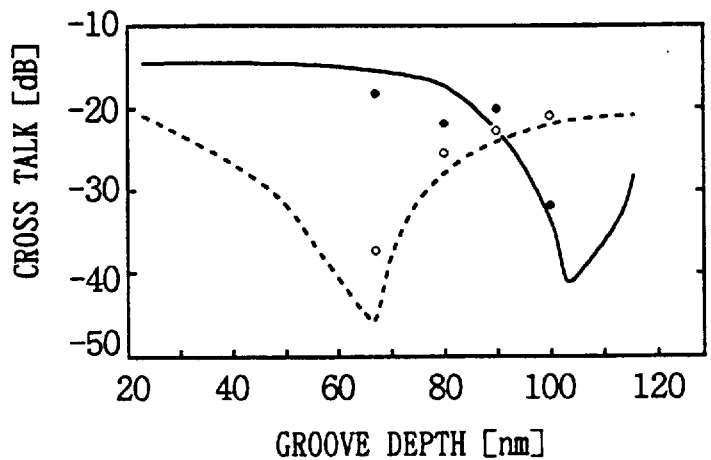
FIGS. 5(A) and 5(B) are characteristic diagrams showing the values of the cross talk which were obtained by calculation and the values of the cross talk which were measured with a $\lambda/12$ board as a phase compensating board.
Figure 5B:
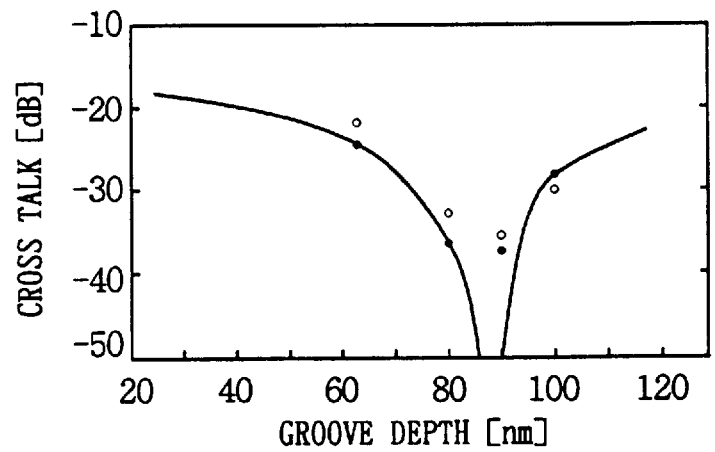

Next, the cross talk of the magneto-optical disk where the Kerr ellipticity $\epsilon_k$ exceeds 0.1° was measured by experiment by using a $\lambda/12$ board as the phase compensating board 21. The results of the experiment are shown in FIGS. 5(A) and 5(B). The experimental results shown in FIGS. 5(A) and 5(B) were obtained when the Kerr rotational angle $\theta_k$ of the magneto-optical recording film of the magneto-optical disk is 1.26° and the Kerr ellipticity $\epsilon_k$ is −0.73°. FIG. 5(A) shows the case where the $\lambda/12$ board as the phase compensating board 21 was not employed. FIG. 5(B) shows the case where the $\lambda/12$ board was employed and where the $\lambda/12$ board was inserted and arranged in the optical system of the head unit so that the crystal optical axis of the $\lambda/12$ board becomes parallel to the linear polarization of the incident light beam. The solid line, the broken line, "●," and "o" in FIGS. 5(A) and 5(B), as with FIGS. 4(A) to 4(C), represent the results of the calculation and the values of measurement of "the cross talk on land" and "the cross talk on groove." The solid line in FIG. 5(B) represents values of calculation which were obtained when the Kerr ellipticity $\epsilon_k$ is 0°.

As shown in FIG. 5(A), in the case where the $\lambda/12$ board was not employed, the physical depths of the groove, where "the cross talk on land" and "the cross talk on groove" become minimum, differ. On the other hand, in the case where the $\lambda/12$ board was employed, the value of measurement nearly matches with the value of calculation when the Kerr ellipticity $\epsilon_k$ is 0°, and the cross talk becomes minimum when the physical depth of the groove is 90 nm. In a recording and/or reproducing device using an already standardized magneto-optical disk, the cross talk value is required to be less than −26 dB. In this embodiment, the range of the physical depth of the groove, where the aforementioned cross talk value of less than −26 dB is obtained in recording and/or reproducing a digital signal or digital data on or from a magneto-optical disk, becomes a range from about 80 nm to 95 nm. This is because the $\lambda/12$ board has a retardation of 30° and shifts the Kerr ellipticity $\epsilon_k$ of an incident light beam by a phase of 0.1°.

As described above, when the Kerr ellipticity $\epsilon_k$ shown in FIG. 5(B) is 0°, the calculated value and the measured value of the cross talk nearly match with each other. In other words, it is shown that the depth dependence of the cross talk in the case of the Kerr ellipticity $\epsilon_k$ being 0° is obtained by employing a wavelength board having retardation so that a phase occurring due to the Kerr ellipticity $\epsilon_k$ is canceled.

As described above, the optical depth of the groove 3 of the magneto-optical disk 1 is formed so as to become approx. $\lambda/6$, and the magneto-optical recording film 5 is formed with material or a multilayer so that the Kerr ellipticity $\epsilon_k$ becomes 0°. With this, even in the case data was recorded on both the land 2 and the groove 3, the cross talk leaking from the land or the groove can be reduced and the recording density of the magneto-optical disk 1 can be thus enhanced, in reading data from the land 2 and the groove 3.

Figure 6:
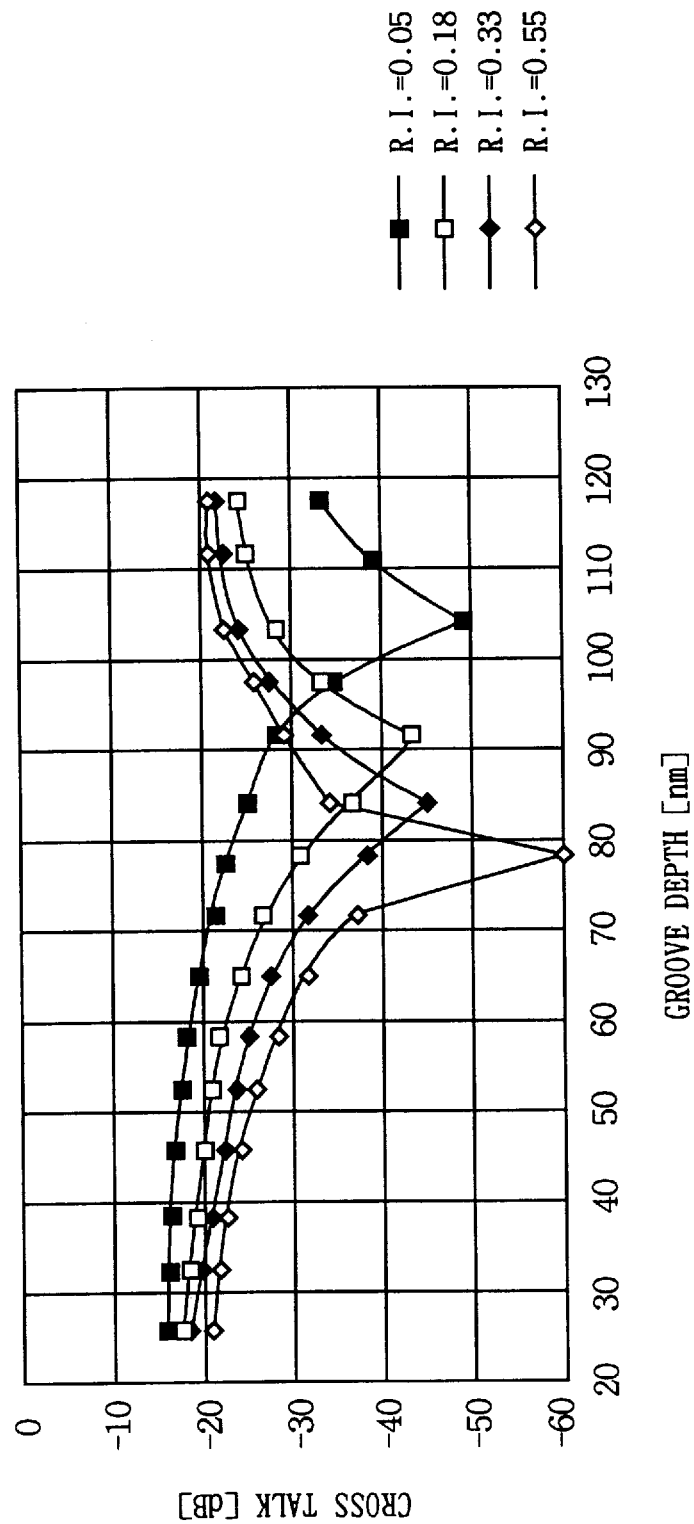
FIG. 6 is a characteristic diagram showing the relationship between a normalized value and cross talk, the normalized value being obtained by normalizing the intensity of a Gaussian beam incident on an object lens, obtained at the end of the object lens, with the intensity at the center of the object lens.

However, the optical depth of the groove 3 does not always need to be about $\lambda/6$. As described below, similar effects can be obtained even when the lower limit of the optical depth of the groove 3 is about $\lambda/8$ and also the upper limit is less than $\lambda/4$. The result of the experiment is shown in FIG. 6. In FIG. 6, RI represents values which were obtained by normalizing the intensity at the object lens end of the disk in radial direction of a Gaussian beam incident on the object lens by means of the intensity of the Gaussian beam at the center of the object lens, and the cases of RI being 0.05, 0.18, 0.33, and 0.55 are shown. For the conditions of this experiment, the wavelength $\lambda$ of a beam light, irradiated to the magneto-optical disk, is 780 nm, the numerical aperture NA of the object lens is 0.53, the mark length of a signal, recorded on the magneto-optical disk, is 1 $\mu$m, and the widths of the land and the groove each are 0.8 $\mu$m. As evident in FIG. 6, the physical depth of the groove where the width of the cross talk becomes minimum depends upon the value of RI. As described above, in recording a digital signal or digital data on the magneto-optical disk, the range of the physical depth of the groove where the cross talk of less than −26 dB is obtained becomes a range where the lower limit is about 65 nm and the upper limit is less than 130 nm, as shown in FIG. 6. This is equivalent to the case where the lower limit of the optical depth of the groove is about $\lambda/8$ and the upper limit is less than $\lambda/4$.

Also, in the head unit 10 according to the aforementioned embodiment, the phase compensating board 21 comprising a wavelength board is inserted and arranged between the beam splitter 13 and the $\lambda/2$ board 15, thereby compensating the Kerr ellipticity $\epsilon_k$ of the magneto-optical recording film 5 of the magneto-optical disk 1 where the optical depth of the groove 3 is formed to about $\lambda/6$. As a consequence, as with the case where the Kerr ellipticity $\epsilon_k$ of the magneto-optical recording film 5 of the magneto-optical disk 1 is not 0°, even when data has been recorded on both the land 2 and the groove 3, the cross talk can be reduced in reading data from the magneto-optical disk 1. Consequently, because data can be recorded on both the groove and the land of the magneto-optical disk 1, the recording density of the magneto-optical disk 1 can be enhanced.

In the present invention described above, an example of the magneto-optical disk, where grooves are concentrically or spirally formed, has been described as a magneto-optical recording medium. The present invention is not limited to a magneto-optical disk such as this, but it is also applicable to a magneto-optical disk where a plurality of pre-pits for detecting a tracking error are formed instead of grooves. In this case, in a digital signal or digital data recording area following the pre-pit, grooves whose optical depth is about $\lambda/6$ have been previously formed across the center of a virtual track prescribed with the pre-pit. With this, as with the magneto-optical disk of the aforementioned embodiment, an effect of reducing cross talk is obtainable.

Also, in the aforementioned head unit according to the present invention, the phase compensating board 21 has been inserted and arranged between the beam splitter 13 and the $\lambda/2$ board 15. The present invention is not limited to this, but the phase compensating board 21 may be arranged and inserted in any position in a return optical path between the object lens 14 and the polarization beam splitter 16. In this case, the optical axis of the phase compensating board 21 with respect to an incident light beam is regulated according to the position where the phase compensating board 21 is arranged and inserted. With this, the same effect as that of the head unit of the aforementioned embodiment is obtainable. In addition, the phase compensating board 21 is not limited to the wavelength board. Even when there is employed an optical phase delay device having retardation so that a phase ($\tan^{-1}(\epsilon_k/\theta_k)$) caused by the Kerr ellipticity $\epsilon_k$ is canceled, a similar effect is obtainable.

I claim:

1. A magneto-optical recording medium comprising:
   a substrate formed from material having light transmittivity; and
   a magneto-optical recording film provided on one surface of said substrate;
   wherein in said one surface of said substrate where said magneto-optical recording film is provided, when a wavelength of a light beam, irradiated on said magneto-optical recording medium, is $\lambda$, there are formed grooves having an optical depth where its lower limit is $\lambda/8$ and its upper limit is $\lambda/4$, and said magneto-optical recording film is formed so that the Kerr ellipticity thereof becomes 0°.

2. The magneto-optical recording medium according to claim 1, wherein said grooves are formed so as to have an optical depth of about 1/6 of the wavelength $\lambda$ of the light beam, irradiated on said magneto-optical recording medium.

3. The magneto-optical recording medium according to claim 1, wherein said grooves are formed so that a width of said groove and a width of a land between said grooves become nearly equal to each other.

* * * * *